(12) United States Patent
Wakiwaka et al.

(10) Patent No.: US 6,262,500 B1
(45) Date of Patent: Jul. 17, 2001

(54) VIBRATION GENERATOR

(75) Inventors: Hiroyuki Wakiwaka; Mitsuharu Ezawa, both of Nagano-ken; Naoki Fukuda; Haruo Ito, both of Kanagawa-ken, all of (JP)

(73) Assignee: Teikoku Tsushin Kogyo Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/533,112

(22) Filed: Mar. 22, 2000

(30) Foreign Application Priority Data

Oct. 5, 1999 (JP) .................................................. 11-284401

(51) Int. Cl.⁷ .................................................. H04M 1/00
(52) U.S. Cl. .................. 310/15; 310/17; 310/25; 318/114
(58) Field of Search .................. 310/14, 15, 23, 310/24, 25, 17; 318/114

(56) References Cited

U.S. PATENT DOCUMENTS

| | | | |
|---|---|---|---|
| 2,111,643 | * 3/1938 | Salvatori | 310/25 |
| 2,997,158 | * 8/1961 | Moskowitz et al. | 310/15 |
| 3,312,841 | * 4/1967 | Makino | 310/15 |
| 4,945,269 | * 7/1990 | Kamm | 310/15 |
| 5,287,027 | * 2/1994 | Marshall et al. | 310/21 |
| 5,444,313 | * 8/1995 | Oudet | 310/17 |
| 5,559,378 | * 9/1996 | Oudet | 310/17 |
| 5,587,615 | * 12/1996 | Murray et al. | 310/30 |
| 5,909,068 | * 6/1999 | Wakiwaka et al. | 310/15 |

* cited by examiner

Primary Examiner—Burton S. Mullins
(74) Attorney, Agent, or Firm—Wenderoth, Lind & Ponack, L.L.P.

(57) ABSTRACT

A vibration generator which is durable, provides strong thrust and is capable of being reduced in size, cost and weight includes a movable element (50) having a permanent magnet (60) attached thereto; a stationary element (10) having end faces (23), (25) which oppose, across prescribed gaps, respective ones of end faces (53), (54) of the movable element, with the stationary element being excited by passing a current through an attached coil (30) to form a magnetic path with the movable element; and resilient support members (80) for supporting the movable element so that the movable element can vibrate in a direction in which the stationary element is magnetized by the coil. One pole face of the permanent magnet is arranged to oppose the outer side of the coil, thereby forming a magnetic path in which magnetic flux that emerges from the pole face of the permanent magnet cuts across the outer peripheral side of the coil, penetrates the interior of the coil and then is guided in the direction of N and S poles of the coil. The end faces of the stationary element are excited to desired magnetic poles to thereby vibrate the movable element.

20 Claims, 7 Drawing Sheets

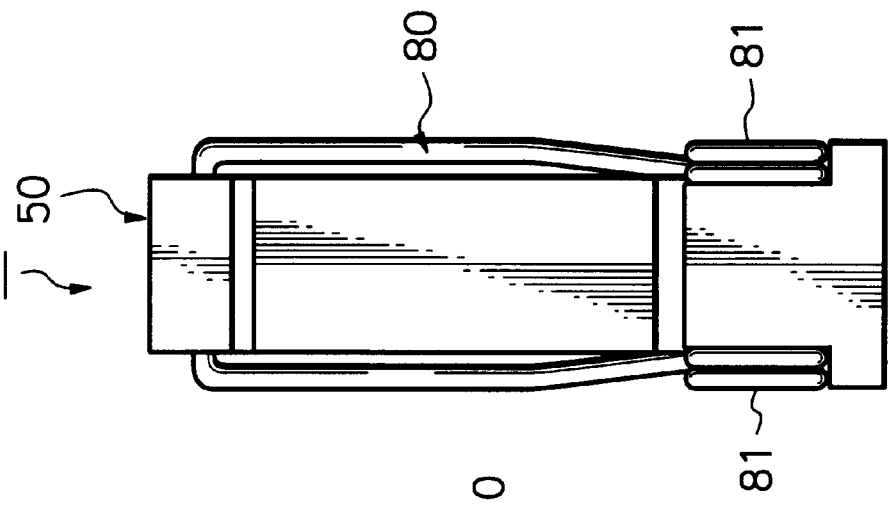
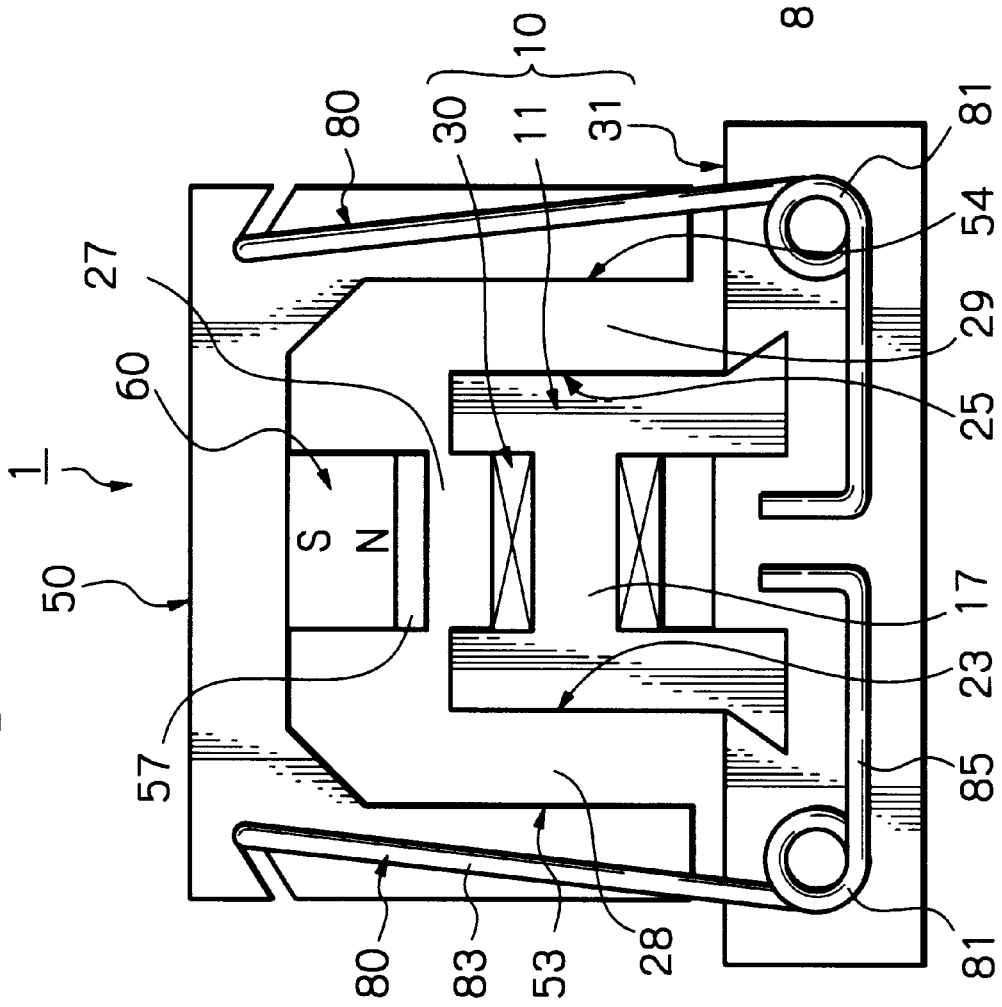

VIBRATION GENERATOR

BACKGROUND OF THE INVENTION

This invention relates to a vibration generator.

Portable devices such as cellular telephones serving as the terminals of a mobile communications system sometimes contain a vibration generator within the portable device itself or within an accessory thereof to inform the user of an incoming call by silent vibration rather than by an audible ringing tone. The vibration produced by the generator is sensed by the human body to alert the user to the call.

Structurally speaking, the conventional vibration generator of this type includes a motor having a rotary shaft and a rotating body mounted on the shaft, wherein the center of gravity of the rotating body is located at a position different from that of the rotary shaft so that vibration is produced when the rotating body is rotated.

In a vibration generator having a structure of this kind, wobbling of the rotary shaft produced when the rotating body is rotated is utilized as the source of vibration. Consequently, the bearings of the rotary shaft of the motor are subjected to excessive force, a situation which detracts from the durability and reliability of the generator.

Taking note of the simple harmonic motion of a movable element that is fixed to the free end (movable end) of a spring, the Applicant has previously proposed a vibration generator (Japanese Patent Application Laid-Open No. 10-180186) which, as shown in FIG. 8, includes a generally C-shaped yoke 210 about which a coil 240 is wound, a leaf spring 220 having a lower end fixed to the approximate center of the yoke 210, and a movable element 230 fixed to the upper, movable end of the leaf spring 220.

The movable element 230 includes two permanent magnets 235, 236 attached to respective ones of both sides of the yoke 234. When a prescribed current is passed through the coil 240, the movable element 230 undergoes simple harmonic motion so that the leaf spring 220 is deflected from side to side.

The proposed vibration generator, however, has a number of shortcomings.

Specifically, though the leaf spring 220 is used as a resilient member for supporting the movable element 230, the leaf spring 220 is highly rigid. As a consequence, there is the danger that the leaf spring 220 will break with prolonged operation. Though the leaf spring 220 may be lengthened in order to prevent this, such an expedient makes it difficult to reduce the size of the vibration generator.

Another problem is that since the leaf spring 220 is fixed to the yoke 210 and movable element 230 by screws or rivets, the fixing operation is troublesome.

In addition, since two permanent magnets 235, 236 are used, this is an obstacle to cost reduction.

Furthermore, the conventional vibration generator does not produce enough vibratory thrust. A vibration generator capable of producing stronger thrust is desired.

SUMMARY OF THE INVENTION

Accordingly, an object of the present invention is to provide a vibration generator which is durable, provides strong thrust and is capable of being reduced in size, cost and weight.

According to the present invention, the foregoing object is attained by providing a vibration generator comprising: a movable element having a permanent magnet attached thereto; a stationary element having end faces which oppose, across prescribed gaps, respective ones of end faces of the movable element, the stationary element being excited by passing a current through an attached coil to form a magnetic path with the movable element; and a resilient support member having one end attached to the movable element and another end attached to the stationary element to thereby support the movable element for vibration in a direction in which the stationary element is magnetized by the coil. One pole face of the permanent magnet is made to oppose the stationary element and the stationary element is excited by the coil to make the end faces of the stationary element desired poles, whereby the movable element is caused to vibrate at a predetermined frequency in the direction in which the stationary element is magnetized by the coil.

Preferably, the one pole face of the permanent magnet is placed so as to oppose an outer peripheral side of the coil attached to the stationary element, thereby forming a magnetic path in which magnetic flux that emerges from the pole face of the permanent magnet passes through the outer peripheral side of the coil, penetrates the interior of the coil and then is guided in the direction in which the stationary element is magnetized by the coil.

Preferably, a high-permeability member is attached to the pole face of the permanent magnet on the side opposing the outer peripheral side of the coil, with the high-permeability member causing magnetic flux to collect at this pole face.

According to another aspect of the present invention, the foregoing object is attained by providing a vibration generator comprising: a movable element having a permanent magnet attached thereto; a stationary element having end faces which oppose, across prescribed gaps, respective ones of the end faces of the movable element, with the stationary element being excited by passing a current through an attached coil to form a magnetic path with the movable element; and a resilient support member having one end attached to the movable element and another end attached to the stationary element to thereby support the movable element for vibration in a direction in which the stationary element is magnetized by the coil. The movable element has arms, which extend toward the stationary element, provided on respective ones of both sides thereof, and the arms have respective inner side surfaces which constitute the end faces that oppose the respective end faces of the stationary element across the prescribed gaps.

Preferably, the resilient support member comprises a coil spring, and the movable element is supported by a pair of the resilient support members so as to vibrate in the direction in which the stationary element is magnetized by the coil.

Preferably, the stationary element comprises a fixed-element yoke to which the coil is attached, and a base made of synthetic resin to which the fixed-element yoke is secured.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2A is a schematic front view and FIG. 2B a schematic side view showing the vibration generator according to the first embodiment of the present invention;

DETAILED DESCRIPTION OF THE INVENTION

A preferred embodiment of the present invention will now be described in detail with reference to the drawings.

Figure 1:
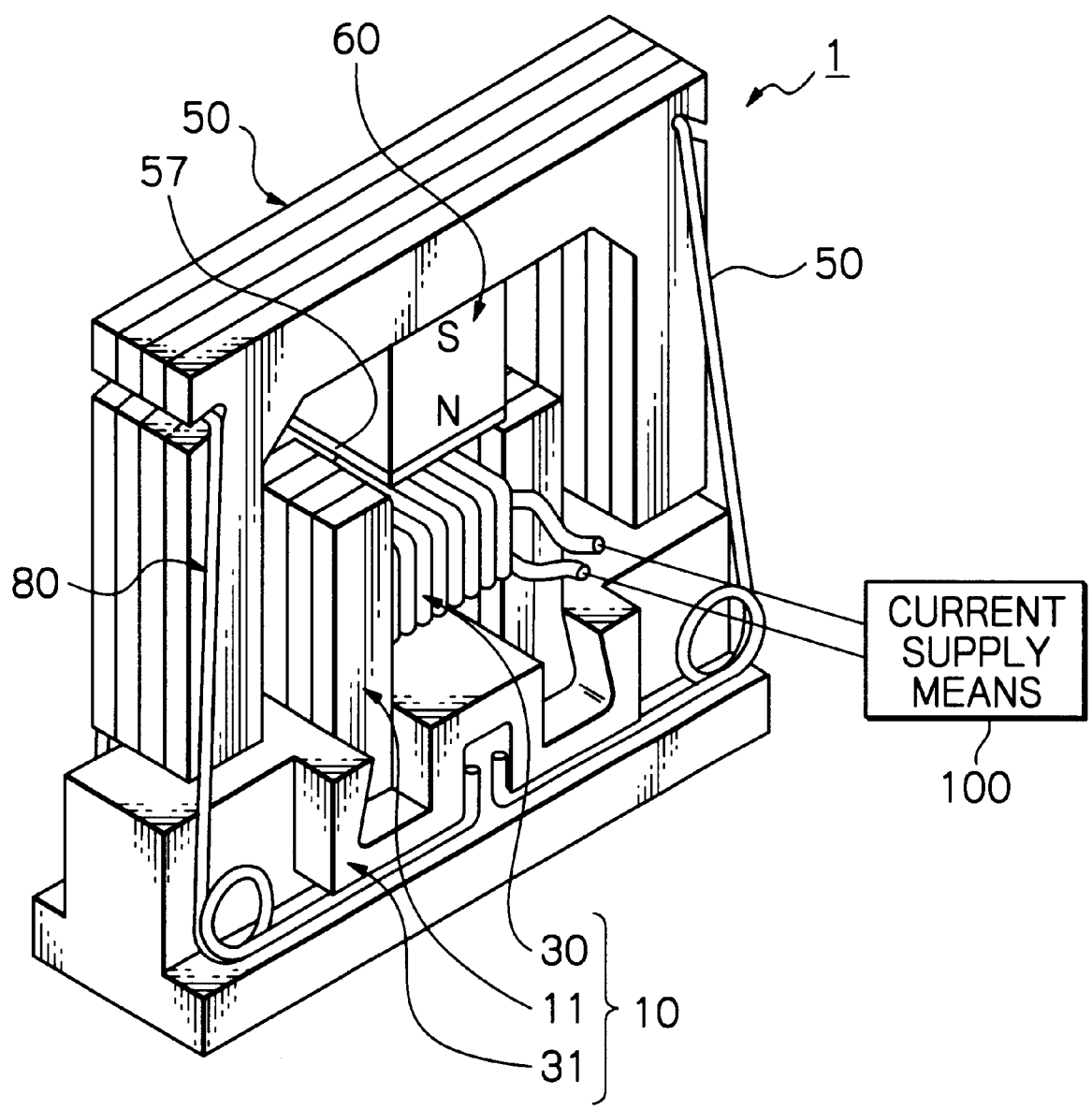
FIG. 1 is a perspective view showing a vibration generator according to a first embodiment of the present invention.
Figure 3:
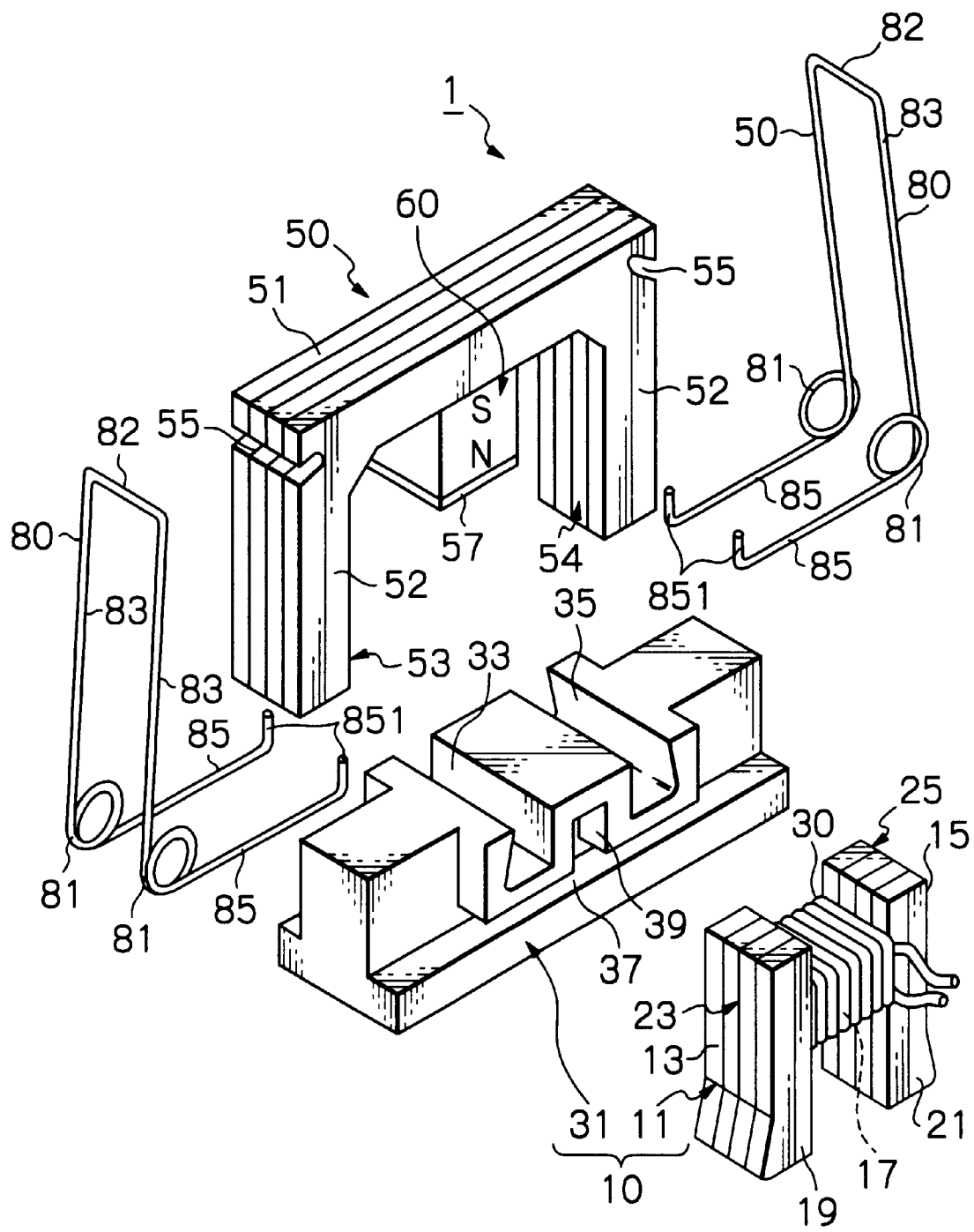
FIG. 3 is an exploded perspective view showing the vibration generator according to the first embodiment of the present invention.

FIG. 1 is a perspective view showing a vibration generator 1 according to a first embodiment of the present invention, FIG. 2A is a schematic front view and FIG. 2B a schematic side view of the vibration generator, and FIG. 3 is an exploded perspective view of the vibration generator. As shown in these drawings, the vibration generator 1 includes a stationary element 10, a movable element 50 and two resilient support members 80 for holding the movable element 50 on the central, upper portion of the stationary element 10.

More specifically, the stationary element 10 comprises a fixed-element yoke 11, a coil 30 and a base 31, as illustrated in FIG. 3. The fixed-element yoke 11 comprises a soft magnetic body such as pure iron and has a generally H-shaped configuration in which longitudinally extending left and right yoke portions 13, 15 are connected by a center yoke portion 17 extending in the transverse direction. An electromagnet is formed by winding the coil 30 about the center yoke portion 17. The lower portions of the left and right yoke portions 13, 15 constitute fixing portions 19, 21, and the outer side surfaces of the upper portions of the left and right yoke portions 13, 15 constitute end faces 23, 25 of a magnetic path. Both ends of the coil 30 are connected to current supply means 100 (see FIG. 1).

The base 31 is made of molded synthetic resin and has recessed fixing portions 33, 35 into which the fixing portions 19, 21 of the fixed-element yoke 11 are inserted and secured, grooves 37 (only the groove on the front side being shown in FIG. 3) extending transversely in the form of slits, and an upwardly directed groove 39 provided in the proximity of the center of the groove 37.

The resilient support members 80 are so-called double-torsion coil springs each of which is constructed by bending a single piece of wire. The wire has two coil portions 81 each obtained by coiling the wire approximately one-and-a-half turns, two substantially parallel arms 83 extending from one side of the coil portions 81 and two substantially parallel arms 85 extending from the other side of the coil portions 81. The arms 83 on one side are connected by a connecting portion 82, and the arms 85 on the other side are bent upward at their distal ends to serve as anchoring ends 851.

The movable element 50 includes a movable yoke 51 consisting of a material similar to that of the fixed-element yoke 11, and a permanent magnet 60 attached to the movable yoke 51. The movable yoke 51, which has a generally C-shaped configuration, has two arms 52 the inner side surfaces of which constitute end faces 53, 54 that oppose end faces 23, 25, respectively, of the fixed-element yoke 11 across prescribed gaps. The permanent magnet 60 is attached to the movable yoke 51 with one pole face (the S pole face in this embodiment) in abutting contact with the underside of the movable yoke 51 at the central portion thereof. The outer side surfaces of the arms 52 of the movable yoke 51 at the upper portions thereof are provided with groove-shaped engaging portions 55 for engaging respective ones of the connecting portions 82 of the resilient support members 80. A plate-shaped high-permeability member 57 is attached to the pole face on the opposite side of the permanent magnet 60 (namely the N pole face in this embodiment, that is, the pole face of the permanent magnet 60 on the side opposing the outer peripheral surface of the coil 30). The high-permeability member 57 causes magnetic flux to collect at this pole face and consists of a material such as pure iron.

To assemble the vibration generator 1, the fixing portions 19, 21 of the fixed-element yoke 11 are inserted and secured in the recessed fixing portions 33, 35 of the base 31. Next, the anchoring ends 851 of the resilient support members 80 are inserted into and anchored in the groove 39 of the base 31 from both sides. At this time the portions of the resilient support members 80 on the distal-end side of the arms 85 are inserted into the grooves 37 of the base 31. The connecting portions 82 of the resilient support members 80 are then engaged with the engaging portions 55 of the movable element 50. This completes assembly of the vibration generator 1.

As shown in FIG. 2A, the arrangement is such that the two end faces 23, 25 of the stationary element 10 and the two end faces 53, 54 of the movable element 50 oppose and lie parallel to each other across respective ones of prescribed gaps 28, 29 (the gap dimensions of both of which are identical). The movable element 50 is supported by the resilient support members 80 so as to be capable of vibrating in the direction in which the stationary element 10 is magnetized by the coil 30 (i.e., transversely in FIG. 2A). The pole face of the permanent magnet 60 on the side on which the high-permeability member 57 is attached is disposed so as to oppose the outer peripheral side surface of the coil 30 across a gap 27. The arrangement is such that these opposing surfaces lie parallel to each other.

The magnetic path of the vibration generator 1 thus constructed is formed so as to penetrate the center yoke portion 17 of the fixed-element yoke 11 through the outer peripheral side of the coil 30 from the pole face of the permanent magnet 60 on which the high-permeability member 57 is attached, extend in the direction in which the stationary element 10 is magnetized by the coil 30 (in the directions of the N and S poles, namely in the directions of both end faces 23, 25), penetrate both end faces 53, 54 of the movable element 50 from both end faces 23, 25 of the stationary element 10 through the gaps 28, 29, and penetrate the other pole face of the permanent magnet 60 from the center of the movable yoke 51.

If a prescribed current is passed through the coil 30 by the current supply means 100, the movable element 50 starts simple harmonic motion transversely in FIG. 2A. The principle of this operation will now be described.

Figure 4:
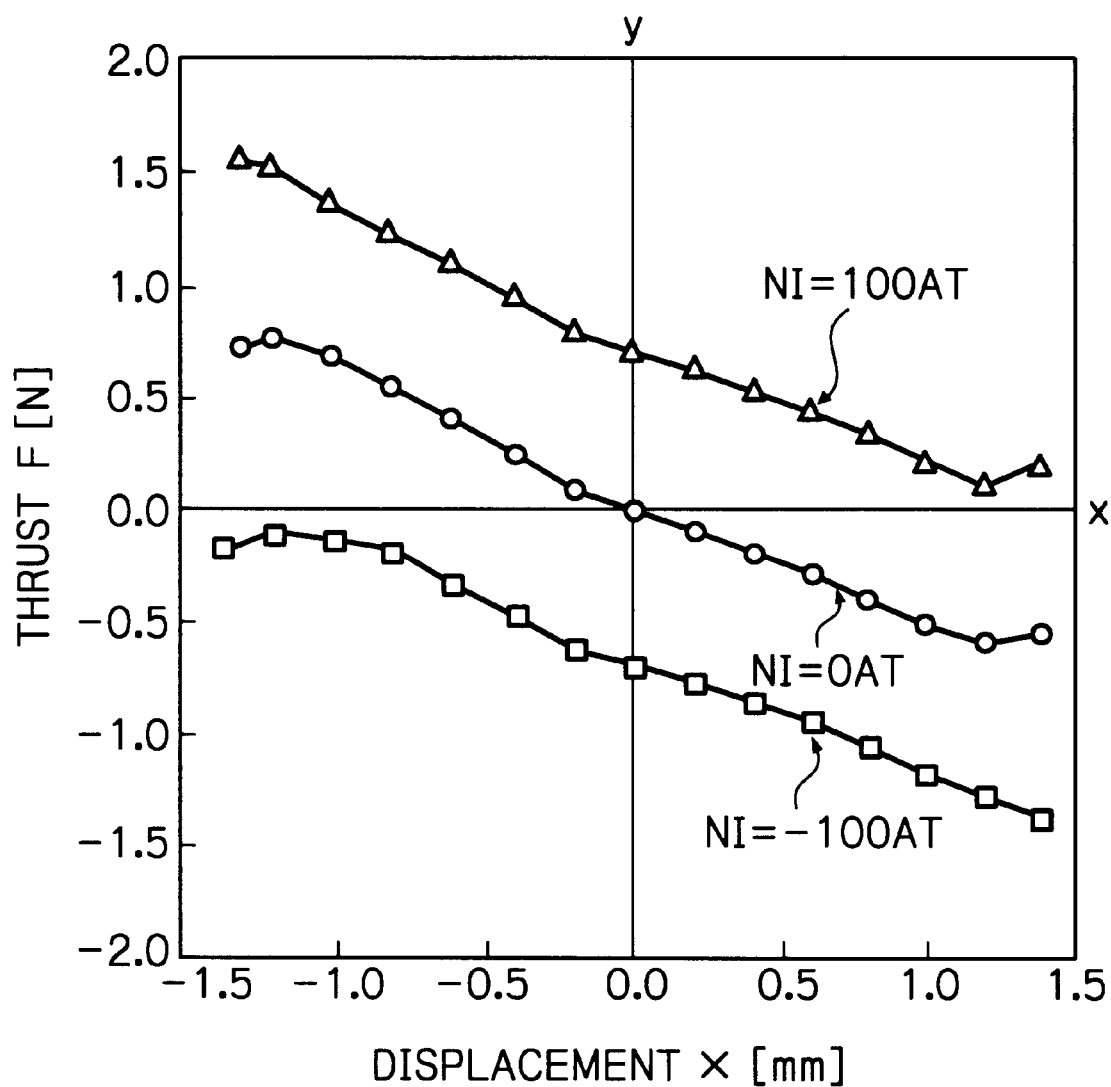
FIG. 4 is a graph illustrating the relationship between displacement of a movable element and thrust that acts upon the movable element.

FIG. 4 is a graph illustrating the relationship between transverse displacement x (mm) of the movable element 50 and transverse thrust F (N) that acts upon the movable element 50. Positive values of thrust F indicate a rightward directed force in FIG. 2A, and negative values of thrust F indicate a leftward directed force in FIG. 2A. Positive values of displacement x indicate displacement to the right in FIG. 2A, and negative values of displacement x indicate displacement to the left in FIG. 2A. In this embodiment, the gaps 28, 29 both have a size of 1.5 mm.

The circles in FIG. 4 indicate the resultant of the magnetic force of the permanent magnet 60 and the elastic force of the resilient support members 80 in the absence of applied current to the coil 30. The triangles indicate the resultant of the magnetic force of the permanent magnet 60 and the elastic force of the resilient support members 80 in combination with an electromagnetic force produced when a current NI=+100 (AT) is passed through the coil 30. The squares indicate the resultant of the magnetic force of the permanent magnet 60 and the elastic force of the resilient support members 80 in combination with an electromagnetic force produced when a current NI=−100 (AT) is passed through the coil 30.

As shown in FIG. 4, the thrust applied to the movable element 50 is substantially linear in all cases. This indicates that each case is ideal for the purpose of subjecting the movable element 50 to simple harmonic motion. The reason why such thrust is obtained will now be described.

Figure 5:
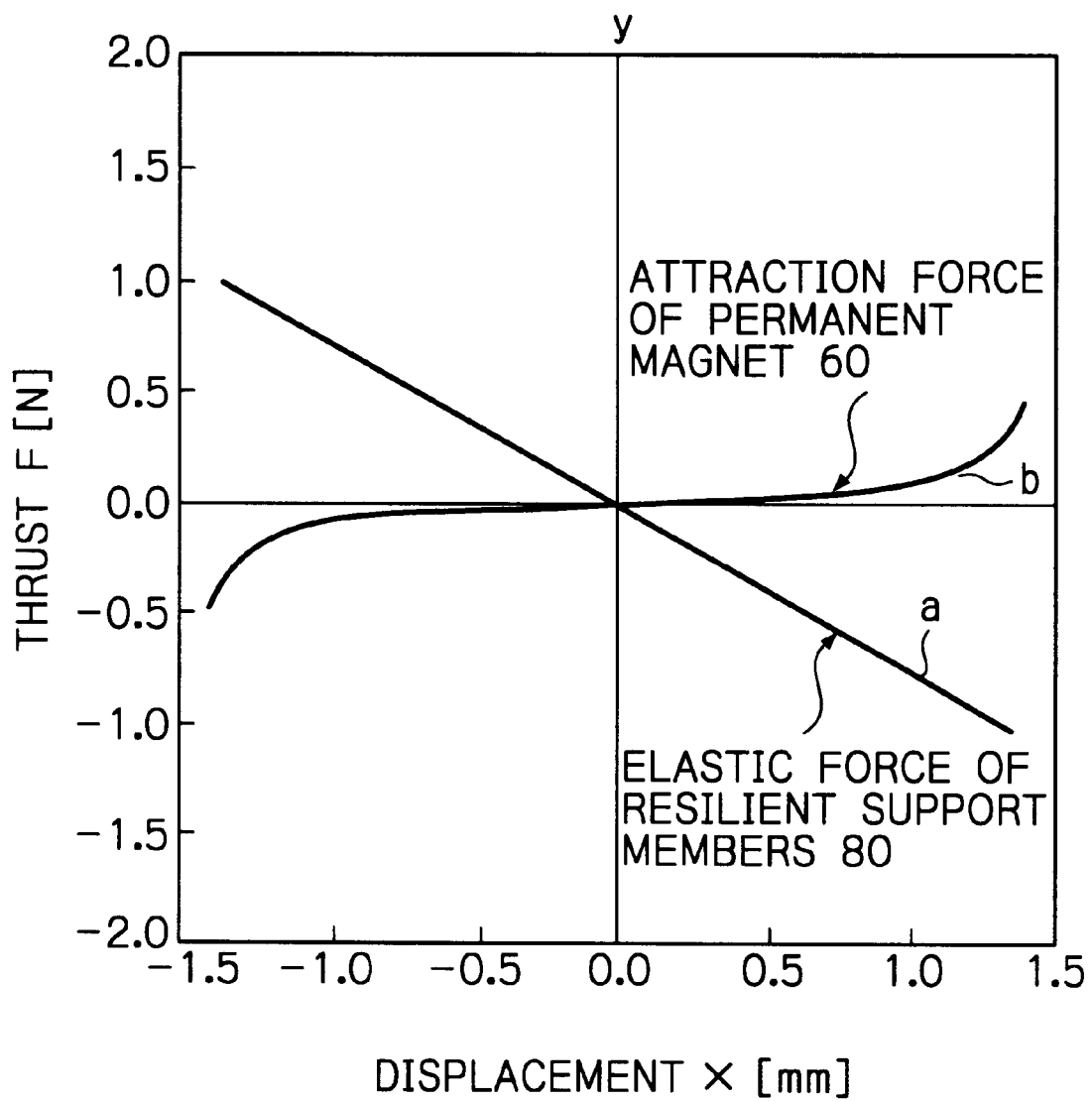
FIG. 5 is a graph illustrating the relationship among thrust produced by a permanent magnet, thrust produced by resilient support members and displacement of the movable element.

As indicated by curve a in FIG. 5, the thrust due solely to the resilient support members 80 is a force which attempts to linearly restore the movable element 50 to the neutral position the more displacement x is increased. On the other hand, as indicated by curve b in FIG. 5, the thrust due solely to the permanent magnet 60 is thrust which acts in a direction opposite that of the thrust produced by the resilient support members 80. Almost no thrust is produced if the amount of displacement is small. If the amount of displacement increases so that either the left gap 28 or right gap 29 becomes smaller, thrust increases sharply in the direction of the smaller gap. If both thrusts are combined, therefore, the substantially linear thrust indicated by the circles in FIG. 4 is obtained. The reason why thrust due solely to the permanent magnet 60 is as indicated by the curve b in FIG. 5 is that since both end faces 53, 54 of the movable element 50 are S poles, the movable element 50 is not attracted to the left or right when it is at the neutral position. However, if either end face 53 or 54 approaches either end face 23 or 25 of the stationary element 10, a thrust that attempts to bring these faces together increases exponentially. Thus, since the thrust due solely to the permanent magnet 60 is small in the vicinity of the neutral position, the movable element 50 can be held at the neutral position with ease when no current is applied to the coil 30, even if the elastic force of the resilient support members 80 is not that large.

In a case where the current supply means 100 passes a current of NI=+100 (AT) into the coil 30 to excite the stationary element 10 so that its left and right end faces 23, 25 become N and S magnetic poles, the thrust acquired is that obtained by approximate upward translation, over a prescribed width, of the thrust due to the permanent magnet 60 and resilient support members 80, as illustrated in FIG. 4. In other words, regardless of the position to which the movable element 50 is displaced, the thrust acquired will be greater, by a substantially fixed amount of displacement, than the thrust due to the permanent magnet 60 and resilient support members 80. If a current of NI=−100 (AT) is applied, the curve of thrust will, conversely, undergo a downward translation.

Figure 6:
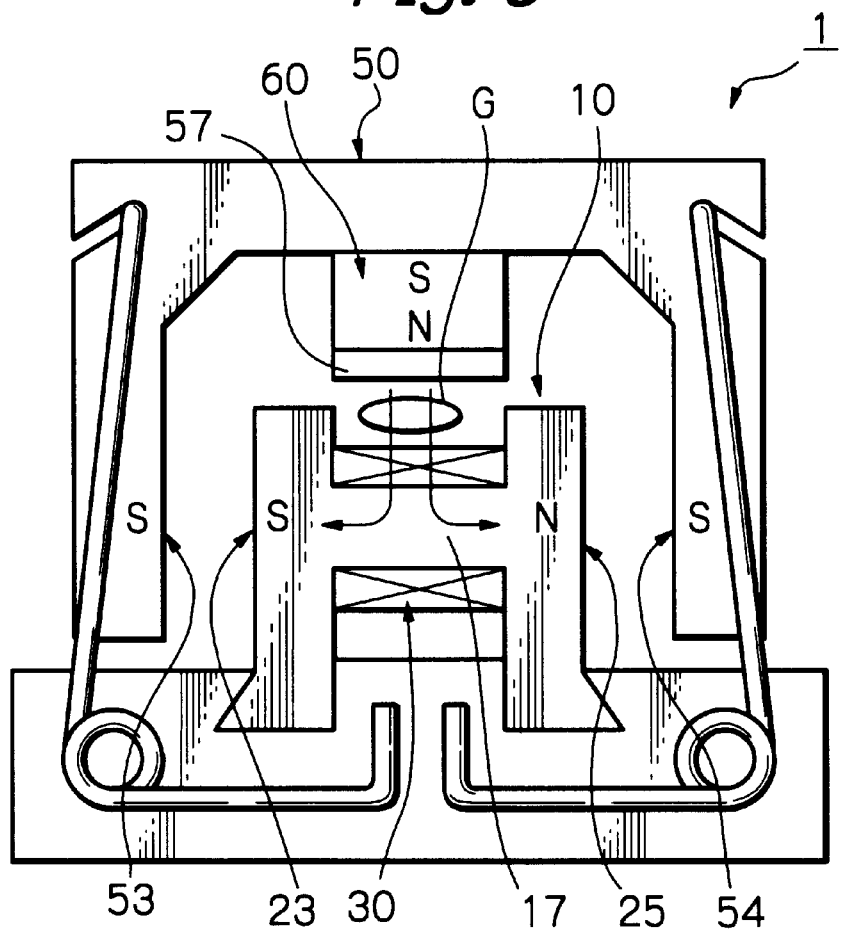
FIG. 6 is a diagram illustrating how forces act upon the movable element.

The reasons for the above are as follows: When the N and S poles are produced in the end faces 23, 25 of the stationary element 10, as shown in FIG. 6, by passing current into the coil 30, a repulsion force acts between the end faces 23, 53 on the left side and an attraction force acts between the end faces 25, 54 on the right side, as a result of which a leftward directed force acts upon the movable element 50. If the movable element 50 is moved to the left, on the other hand, the attraction force acting between the end faces 25, 54 on the right side increases but the repulsion force acting between the end faces 23, 53 on the left side decreases. The overall result is that a thrust which attempts to move the movable element 50 to the left is substantially constant at any position.

Figure 7:
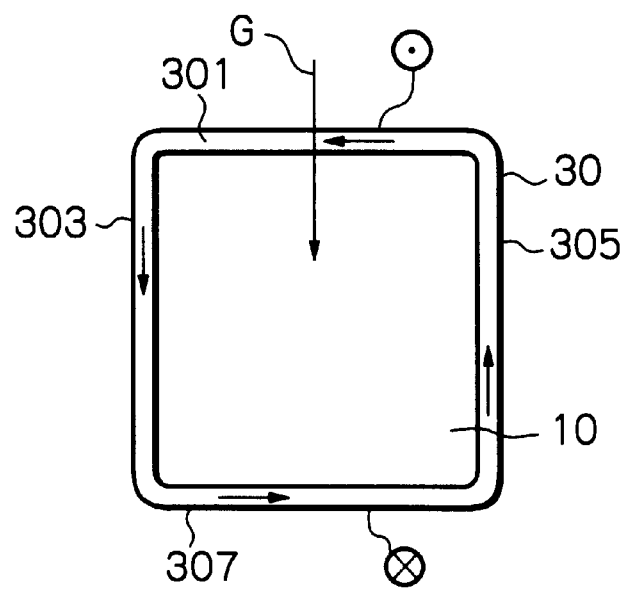
FIG. 7 is a diagram illustrating how forces acts upon a coil in accordance with Fleming's rule.

In the present invention, yet another thrust is at work. Specifically, as shown in FIG. 6, magnetic flux G from the pole face of the permanent magnet 60 on the side to which the high-permeability member 57 is attached passes through the outer peripheral surface of the coil 30, penetrates the interior of the coil 30 and is guided so as to point in the directions of the N and S magnetic poles of the coil 30 in the center yoke portion 17. Therefore, in accordance with Fleming's rule, as shown in FIG. 7 (which illustrates the coil 30 as seen from the right side of FIG. 6, wherein current flows in the direction indicated in FIG. 7 when N and S poles are formed by the coil 30 in the manner shown in FIG. 6), when a current is passed into the coil 30, thrust directed out of the plane of the paper (i.e., to the right in FIG. 6) acts upon an upper segment 301 of the coil 30, no thrust acts upon left and right segments 303, 305, respectively of the coil 30, and a thrust directed into the plane of the paper (i.e., to the left in FIG. 6) acts upon a lower segment 307 of the coil. However, since the flux that passes through the lower segment 307 of the coil is much smaller than the flux that passes through the upper segment 301 of the coil, the end result is that a thrust directed to the right in FIG. 6 acts upon the coil 30.

Since the stationary element 10 is fixed, a thrust directed to the left acts upon the movable element 50 by counteraction. Accordingly, in addition to the thrust produced by the electromagnetic force of the coil 30, a thrust in accordance with Fleming's rule acts in the same direction. As a consequence, the overall thrust attempting to drive the movable element 50 increases. In a case where an electric current flows into the coil 30 in the opposite direction, the thrust in accordance with Fleming's rule also acts in the opposite direction. In this embodiment, the high-permeability member 57 is attached to the pole face on the side of the permanent magnet 60 opposing the outer peripheral surface of the coil 30. As a result, magnetic flux is capable of concentrating at this pole face and the flux can be guided inwardly in an effective manner through the outer peripheral side of the coil 30. Accordingly, the thrust in accordance with Fleming's rule is increased.

A method of driving the vibration generator 1 will be described next.

When no current is flowing into the coil 30, the resilient support members 80 hold the movable element 50 at the neutral position, as shown in FIG. 2.

If current (NI=−100 AT) is supplied to the coil 30 from the current supply means 100, the end faces 23, 25 of the stationary element 10 are excited into S and N magnetic poles, respectively, as shown in FIG. 6, so that the end face 54 of the coil 30 is pulled toward the end face 25 (i.e., leftward in FIG. 6). The reason for this is that thrust is negative at displacement x=0, as indicated by the lowermost curve in FIG. 4. If the direction of the current supplied to the coil 30 is reversed (NI=+100 AT) when the end face 54 of the movable element 50 approaches the end face 25, then thrust becomes as indicated by the uppermost curve in FIG. 4. Since this pulls the movable element 50 in the opposite direction (rightward in FIG. 6), the movable element 50 starts moving in the opposite direction.

By repeatedly reversing the electric current in conformity with the oscillation frequency of the movable element 50, the movable element 50 is caused to move in the opposite direction immediately before the end faces 53, 54 of the movable element 50 contact the end faces 23, 25 of the stationary element 10 (that is, the end faces 23, 25 never contact the end faces 53, 54) so that the movable element 50 can be made to vibrate repeatedly.

In this embodiment, the movable element 50 is supported by the pair of left and right resilient support members 80. As a result, the movable element 50 can be made to undergo approximate translational motion in the transverse direction, the motion of the end faces 53, 54 of movable element 50 relative to the end faces 23, 25 of the stationary element 10 can be made to undergo approximate translational motion, and the gap 27 between the high-permeability member 57 and the stationary element 10 is rendered substantially constant. Thus, the structure is one which does not disturb the magnetic path, as a result of which stable vibration is assured.

It should be noted that an arrangement may be adopted in which the following operation is repeated: A current is passed into the coil 30, thereby causing the movable element 50 to be attracted toward end face 23 or 25, and the supply of current is subsequently halted, thereby allowing the movable element 50 to vibrate at a predetermined resonance frequency. Then, when this vibration has attenuated, current is passed into the coil 30 again to enlarge the amplitude of vibration of the movable element 50, after which the current is halted again. Further, current may be supplied in pulsed form at a timing other than that mentioned above. If such an arrangement is adopted, current need not be supplied constantly, thereby making it possible to reduce power consumption.

In this embodiment, coil springs are used as the resilient support members 80. Since the coil portions 81 of these coil springs twist, the arms 83, 85 on both sides of the coil portions 81 need only flex by a small amount. In comparison with the leaf spring 220 shown in FIG. 8, therefore, durability of the resilient support members 80 when they are vibrated is enhanced greatly and problems such as breakage due not arise even when the device is vibrated over an extended period of time. In particular, since the coil portions 81 are not axially supported as by shaft members or the like in this embodiment, they are in a free state. This is ideal because it eliminates friction that would otherwise be produced by axial support.

Figure 8:
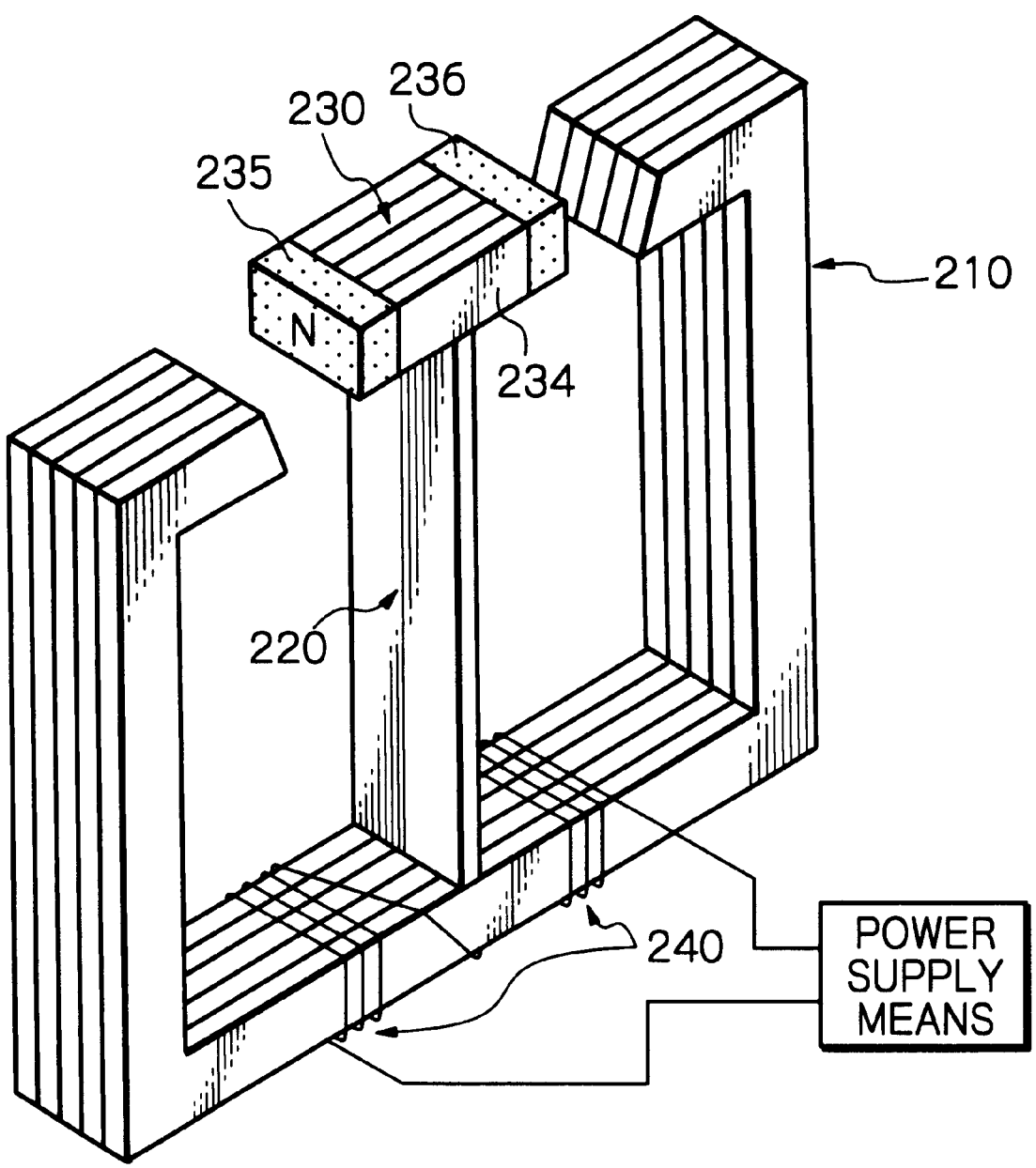
FIG. 8 is a perspective view illustrating a vibration generator according to an example of the prior art.

Further, since one permanent magnet 60 forming part of the movable element 50 is adopted in this embodiment, the number of permanent magnets is reduced over the prior-art example of FIG. 8, thereby lowering cost.

According to this embodiment, both sides of the movable element are provided with arms extending toward the stationary element, and the inner side surfaces of the arms serve as end faces that oppose both end faces of the stationary element across the prescribed gaps. Such a configuration has a low center of gravity and left-right symmetry, which provide stability. The result is stable vibration.

Though an embodiment of the present invention has been described in detail above, the invention is not limited to this embodiment and can be modified in various ways within the scope of the claims and within the scope of the technical concept set forth in the specification and drawings overall. Shapes, numbers and materials that appear in the embodiment are not restrictive in nature and any shapes, numbers and materials will suffice so long as they manifest the effects of the present invention.

For example, the shapes, structures and materials of the stationary element, movable element, coil and high-permeability member, etc., can be modified in various ways. Further, it goes without saying that the vibration generator according to the present invention is not limited to use in a portable device and can be applied to any device in which vibration is desired to be produced.

The present invention provides a number of advantages, described below.

(1) Since one pole face of the permanent magnet is made to oppose the stationary element, the movable element can be constructed with good balance from a single permanent magnet.

(2) By placing one pole face of the permanent magnet so as to oppose the outer peripheral side surface of the coil, there is formed a magnetic path in which the magnetic flux that emerges from the pole face of the permanent magnet passes through the outer peripheral side of the coil, penetrates the interior of the coil and then is guided in the direction in which the stationary element is magnetized by the coil. As a result, when current is passed into the coil, thrust in accordance with Fleming's rule is applied into addition to thrust produced by the electromagnetic force generated by the coil, thereby increasing the overall thrust that drives the movable element.

(3) In a case where a high-permeability member is attached to the pole face of the permanent magnet on the side opposing the outer side surface of the coil, whereby magnetic flux collects at the pole face, the flux can be caused to concentrate at the pole face and the flux can be guided inwardly in an effective manner through the outer peripheral side of the coil. This makes it possible to increase the thrust produced by Fleming's rule so that the thrust that drives the movable element can be increased further.

(4) Both sides of the movable element are provided with arms extending toward the stationary element, and the inner side surfaces of the arms serve as end faces that oppose both end faces of the stationary element across the prescribed gaps. Such a configuration has a low center of gravity and left-right symmetry, which provide stability. The result is stable vibration.

(5) Since coil springs are used as the resilient support members, no problems arise even if the movable element is vibrated for an extended period of time, and durability is enhanced greatly. Since the coil springs possess excellent durability with respect to vibration, they can be reduced in length. This contributes to miniaturization. In addition, attaching the coil springs is easy and simple.

(6) Since the movable element is supported by a pair of resilient support members, motion of the movable element can be made approximate translational motion in the transverse direction. Thus, the structure is one which does not disturb the magnetic path, as a result of which stable vibration is assured.

(7) The stationary element is obtained by securing the fixed-element yoke having the coil attached thereto to the base made of synthetic resin. As a result, the stationary element is reduced in weight overall.

(8) A single permanent magnet is sufficient for forming part of the movable element, thereby making it possible to lower cost.

(9) The structure of the device is simplified and lends itself to a reduction in size.

What is claimed is:

1. A vibration generator comprising:

a movable element having a permanent magnet attached thereto;

a stationary element having a coil attached thereto and end faces which oppose, across prescribed gaps, respective ones of end faces of said movable element, said stationary element to be excited by passing a current through said coil to form a magnetic path with said movable element; and a pair of coil springs, wherein each of said coil springs includes two coil portions, two substantially parallel arms extending from one side of said coil portions, respectively, and two substantially parallel arms extending from another side of said coil portions, respectively, with said arms extending from said one side of said coil portions being interconnected by a connecting portion, and wherein said connecting portion is attached to said movable element, and said arms extending from the another side of said coil portions are attached to said stationary element to thereby support said movable element for vibration in a direction in which said stationary element is to be magnetized by said coil.

2. The vibration generator according to claim 1, wherein said movable element has arms which extend toward said stationary element and are provided on respective sides of said stationary element, wherein said arms have respective inner side surfaces which constitute said respective ones of end faces of said movable element that are opposed by said end faces of said stationary element.

3. The vibration generator according to claim 2, wherein said stationary element includes a fixed-element yoke to which said coil is attached, and a base made of synthetic resin to which said fixed-element yoke is secured.

4. The vibration generator according to claim 3, wherein said fixed-element yoke has respective outer surfaces which constitute said end faces of said stationary element that oppose said respective ones of end faces of said movable element.

5. The vibration generator according to claim 1, wherein said permanent magnet has one pole face that is made to oppose said stationary element, and said stationary element is to be excited by said coil to make said end faces of said stationary element desired poles, whereby said movable element is caused to vibrate at a predetermined frequency in the direction in which said stationary element is magnetized by said coil.

6. The vibration generator according to claim 5, wherein said one pole face of said permanent magnet is made to oppose said stationary element so as to oppose an outer peripheral side of said coil, thereby to form a magnetic path in which magnetic flux that emerges from said one pole face passes through the outer peripheral side of said coil, penetrates the interior of said coil and then is guided in the direction in which said stationary element is magnetized by said coil.

7. The vibration generator according to claim 6, wherein a high-permeability member is attached to said one pole face on the side opposing the outer peripheral side of said coil, said high-permeability member to cause magnetic flux to collect at said one pole face.

8. A vibration generator comprising:

a movable element having a permanent magnet attached thereto;

a stationary element having a coil attached thereto and end faces which oppose, across prescribed gaps, respective ones of end faces of said movable element, said stationary element to be excited by passing a current through said coil to form a magnetic path with said movable element; and a resilient support member having one end attached to said movable element and another end attached to said stationary element to thereby support said movable element for vibration in a direction in which said stationary element is to be magnetized by said coil, wherein said permanent magnet has one pole face that is made to oppose said stationary element, and said stationary element is to be excited by said coil to make said end faces of said stationary element desired poles, whereby said movable element is caused to vibrate at a predetermined frequency in the direction in which said stationary element is magnetized by said coil, and wherein said one pole face is made to oppose said stationary element so as to oppose an outer peripheral side of said coil, thereby to form a magnetic path in which magnetic flux that emerges from said one pole face passes through the outer peripheral side of said coil, penetrates the interior of said coil and then is guided in the direction in which said stationary element is magnetized by said coil.

9. The vibration generator according to claim 8, wherein said resilient support member comprises a coil spring, and said movable element is supported by a pair of said resilient support members so as to vibrate in the direction in which said stationary element is to be magnetized by said coil.

10. The vibration generator according to claim 8, wherein said movable element has arms which extend toward said stationary element and are provided on respective sides of said stationary element, wherein said arms have respective inner side surfaces which constitute said respective ones of end faces of said movable element that are opposed by said end faces of said stationary element.

11. The vibration generator according to claim 8, wherein said stationary element includes:

a fixed-element yoke to which said coil is attached; and a base made of synthetic resin to which said fixed-element yoke is secured.

12. The vibration generator according to claim 11, wherein said fixed-element yoke has respective outer surfaces which constitute said end faces of said stationary element that oppose said respective ones of end faces of said movable element.

13. The vibration generator according to claim 8, wherein said resilient support member includes a pair of coil springs, with each of said coil springs having two coil portions, two substantially parallel arms extending from one side of said coil portions, respectively, and two substantially parallel arms extending from another side of said coil portions, respectively, with said arms extending from said one side of said coil portions being interconnected by a connecting portion, and wherein said one end of said resilient support member is attached to said movable element by having said connecting portion be attached to said movable element, and said another end of said resilient support member is attached to said stationary element by having said arms extending from the another side of said coil portions be attached to said stationary element.

14. The vibration generator according to claim 13, wherein said movable element has arms which extend toward said stationary element and are provided on respective sides of said stationary element, wherein said arms have respective inner side surfaces which constitute said respective ones of end faces of said movable element that are opposed by said end faces of said stationary element.

15. The vibration generator according to claim 8, wherein a high-permeability member is attached to said one pole face on the side opposing the outer peripheral side of said coil, said high-permeability member to cause magnetic flux to collect at said one pole face.

16. The vibration generator according to claim 15, wherein said resilient support member comprises a coil spring, and said movable element is supported by a pair of said resilient support members so as to vibrate in the direction in which said stationary element is to be magnetized by said coil.

17. The vibration generator according to claim 15, wherein said stationary element includes:

a fixed-element yoke to which said coil is attached; and a base made of synthetic resin to which said fixed-element yoke is secured.

18. The vibration generator according to claim 17, wherein said fixed-element yoke has respective outer surfaces which constitute said end faces of said stationary element that oppose said respective ones of end faces of said movable element.

19. The vibration generator according to claim 18, wherein said stationary element includes a fixed-element yoke to which said coil is attached, and a base made of synthetic resin to which said fixed-element yoke is secured.

20. The vibration generator according to claim 19, wherein said fixed-element yoke has respective outer surfaces which constitute said end faces of said stationary element that oppose said respective ones of end faces of said movable element.

\* \* \* \* \*